United States Patent [19]

Green et al.

[11] Patent Number: 5,581,394
[45] Date of Patent: Dec. 3, 1996

[54] SOLID POLYMER ELECTROLYTES

[75] Inventors: Mino Green, London, England; Karam S. Kang, Kingston, Canada

[73] Assignee: British Technology Group Limited, London, England

[21] Appl. No.: 190,188

[22] PCT Filed: Aug. 13, 1992

[86] PCT No.: PCT/GB92/01500

§ 371 Date: Feb. 15, 1994

§ 102(e) Date: Feb. 15, 1994

[87] PCT Pub. No.: WO93/04507

PCT Pub. Date: Mar. 4, 1993

[30] Foreign Application Priority Data

Aug. 14, 1991 [GB] United Kingdom ............ 9117709

[51] Int. Cl.$^6$ ................................................ G02F 1/153
[52] U.S. Cl. ................................................ 359/270
[58] Field of Search ........................ 359/265, 270, 359/271, 272, 273; 429/192

[56] References Cited

U.S. PATENT DOCUMENTS

| 4,009,936 | 3/1977 | Kasai | 350/160 R |
|---|---|---|---|
| 4,728,117 | 3/1988 | Stepanek | 280/625 |
| 4,750,817 | 6/1988 | Sammells | 350/357 |
| 4,792,504 | 12/1988 | Schwb et al. | 429/192 |
| 4,798,773 | 1/1989 | Yasukawa et al. | 429/192 |
| 4,824,222 | 4/1989 | Green | 350/357 |
| 4,842,381 | 6/1989 | Green | 350/357 |
| 4,902,110 | 2/1990 | Green | 350/357 |
| 5,035,965 | 7/1991 | Sangyoji et al. | 429/124 |
| 5,202,009 | 4/1993 | Andrieu | 204/296 |

FOREIGN PATENT DOCUMENTS

| 0331342 | 9/1989 | European Pat. Off. . |
|---|---|---|
| 424827 | 5/1991 | European Pat. Off. . |
| 55-86070 | 6/1980 | Japan . |
| 2081922 | 2/1982 | United Kingdom . |
| 2164170 | 3/1986 | United Kingdom . |
| 2197527 | 5/1988 | United Kingdom . |
| 2246872 | 2/1992 | United Kingdom . |

OTHER PUBLICATIONS

Mizuno "Electrochromic Display Device" Feb. 1985, Re JP–A 60–37530.

"Antistatic acrylic resin compsn.– comprises methyl methacrylate polymer, lithium perchlorate, ethylene– and/or propylene–carbonate", Kyowa Gas Chem Ind., Jul. 1988, p. 3.

Database WPIL, Derwent Publication Ltd., London, GB; AN 91–041083 & JP,A,2 308 819 (Sanyo Chem. Ind.) 21 Dec. 1990 see abstract.

Database WPIL, Derwent Publication Ltd., London, GB; AN 91–320228 & JP, A,3 212 416 (Yuasa Battery) 18 Sep. 1991, see abstract.

Database WPIL, Derwent Publications Ltd., London, GB; & JP,A,4 145 143 (Tokuyama Soda) 19 May 1992, see abstract.

Primary Examiner—Nabil Z. Hindi
Assistant Examiner—Dawn-Marie Bey
Attorney, Agent, or Firm—Cushman Darby & Cushman, L.L.P.

[57] ABSTRACT

Solid polymer electrolytes for electrochromic devices are produced by dissolving lithium perchlorate and polymethylmethacrylate in propylene carbonate, all dried to below 10 ppm water, and screen printing or casting a film of the resulting solution followed by removal of solvent to leave a final polymer concentration of about 40% by weight based on the combined weight of polymer and solvent. Screen printability is conferred by a resin modifier such as MODAFLOW (TM).

20 Claims, No Drawings

SOLID POLYMER ELECTROLYTES

BACKGROUND OF THE INVENTION (1) Field of the Invention

The present invention relates to solid polymer electrolytes processes for producing solid polymer electrolytes and precursors for solid polymer electrolytes. It relates also to electrical devices such as electrochromic devices incorporating such solid polymer electroclytes.

(2) Description of the Related Art

The formulation of polymer electrolytes for use in electrochromic devices is a long-standing problem. Attention has principally been concentrated on the use of polyethylene oxide containing lithium perchlorate as a conductive salt. Propylene carbonate has been used as a solvent in combination with polyethylene oxide.

Japanese Patent Specification No. 60037530 discloses a polymer electrolyte comprising polymethylmethacrylate, propylene carbonate and lithium perchlorate. The contents of polymethylmethacrylate is such that the electrolyte is gelatinous, having a consistency such that it is capable of being injected into an electrochromic cell.

Japanese Patent Specification No. 55-86070 discloses a battery electrolyte comprising polymethylmethacrylate, propylene carbonate and lithium fluoroborate in the form of a gel possessing elasticity produced by cooling a sol formed from the above materials. Battery electrolytes are not generally suitable for use in electrochromic devices and such suitability is not indicated in this specification. No conductivity figures are disclosed, nor are any fabrication methods which would lend themselves to the production of electrochromic devices.

SUMMARY OF THE INVENTION

We have sought to produce an electrolyte which is solid, stable on storage, electrically stable in use in electrochromic devices and preferably capable of being fabricated using a process of screen printing or of casting to form a film or sheet.

The present invention provides a solid polymer electrolyte for an electrochromic device comprising an alkylene carbonate, a polymer in a quantity sufficient to render the electrolyte solid and a conductive salt, preferably a lithium salt, said electrolyte containing no more than 500 ppm water.

DESCRIPTION OF THE PREFERRED EMBODIMENTS

The polymer is preferably an acrylic polymer such as a polyacrylic acid ester. Suitably the polymer is polyalkyl methacrylate, for instance polymethylmethacrylate.

The alkylene carbonate is preferably propylene carbonate.

The lithium salt is preferably lithium perchlorate.

The content of the polymer is sufficient to render the electrolyte solid. Preferably the polymer content is from 35 to 60 percent by weight based upon the combined weight of said polymer and said alkylene carbonate, e.g. 35 to 45 percent. More preferably, said percentage is about 40 percent, e.g. from 38 to 42 percent.

The electrolyte may further comprise an opacifying and reflecting material or pigment such as titanium dioxide. The object of this material is optically to isolate the front from the rear electrode in a display electrochromic cell and to reflect ambient light which has passed through the front electrode material. Suitably, the electrolyte contains from 10 to 30 percent of the opacifying material by weight based upon the weight of the electrolyte, e.g. from 15 to 25 percent.

The electrolyte preferably also comprises a resin modifier such as ethylacrylate, 2-ethylhexylacrylate copolymer. The purpose of the resin modifier will be described below in connection with the fabrication of the electrolyte.

The invention includes a process for making a solid polymer electrolyte comprising forming a precursor solution by dissolving a salt and a polymer in an alkylene carbonate, forming a thin layer of said solution and thereafter removing sufficient of the alkylene carbonate to solidify the electrolyte.

The alkylene carbonate can be removed to solidify the electrolyte by heating the solution.

The solution may he formed into a thin layer or thick film prior to said solidification by casting or by screen printing on to a substrate or support. Multiple layers of the polymer electrolyte may be built-up by sequential cycles of laying down a layer of solution and removing solvent to solidify the layer.

In preparing an electrical device according to the invention, first and second substrates may be printed with precursor formulations according to the invention and solvent may be removed therefrom to produce solid electrolytes according to the invention on the substrates. A further print of precursor may be applied to one or both of the substrates and partially solidified by solvent removal. The substrates may then be mated together to form a substrate-solid electrolyte-substrate sandwich. The partially dried print of precursor serves to provide a tacky and readily matable surface over the previously prepared solid electrolyte.

The precursor solution typically will be viscous and preferably has all of the properties necessary for screen printability. The solution may have suspended in it undissolved solids and these may comprise excess of the salt and/or an opacifying material or pigment as described above.

The solution preferably contains from 10 to 30 percent by weight of said polymer based upon the combined weight of polymer and the alkylene carbonate, for instance about 25 percent by weight.

The solution preferably also contains a resin modifier as described above conferring on said solution the properties of bubble release, surface levelling and clean snap-back so as to render the solution screen printable.

The polymer electrolyte precursor formations may additionally include a plasticizer such as di-iso-octylphthalate in an amount similar to the content of resin modifier described above.

For a successful screen printing operation, it is necessary that the solution will not drip through a screen printing mesh (e.g. a stainless steel 325 openings/inch (128 openings/cm), 50 μm opening, 60 μm thick mesh) with in the time needed to carry out the screen printing operation, e.g. within 5 or more preferably 10 minutes. It is necessary what any bubbles in the solution will be released after screen printing within a reasonable resting time, for instance within 30 minutes or more preferably 15 minutes. It is necessary what the surface of the screen printed layer of solution levels itself after bubbles have been released and have burst at the surface. Lastly, it is necessary that when the screen used in screen printing snaps back off the surface, it snaps back cleanly from the printed solution.

These properties can be obtained by a suitable choice of resin modifier. A preferred ethylacrylate, 2-ethylhexylacrylate copolymer resin modifier is available from Monsanto under the name "Modaflow" (CAS No. 26376-86-3). This is clear yellowish viscous liquid having a flash point of 93° C. and a boiling point of 205° C. at 10 mm Hg pressure (1.3 kPa). It has a specific gravity of 1.01 and is insoluble in water but soluble in most organic salts.

Very little of the Modaflow resin need be included in a screen printable formulation in accordance with the invention, for instance from 0.1 to 5 percent, preferably from 0.5 To 1 percent by weight of the weight of the polymer solution, including any suspended material.

Alternative materials to Modaflow resin modifiers include silicon oils and stearates.

The invention includes a screen printable precursor for a solid polymer electrolyte.

Generally, such a precursor comprises a solvent, a polymer and a conductive salt. Preferably, the nature of the solvent, polymer and conductive salt is as described above.

The polymer electrolyte precursor preferably also comprises a resin modifier as described above conferring on the precursor the required properties for screen printing.

Precursor solutions of the kind described can be stored in dry conditions for a period of months without deterioration.

The invention includes a substantially water free solid polymer electrolyte for an electrochromic device comprising an alkylene carbonate, a polymer in a quantity sufficient to render the electrolyte solid and a conductive lithium salt, said electrolyte containing no more than 10 ppm water.

The invention includes an electrical device comprising an electrode and a counter-electrode separated by a solid polymer electrolyte according to the invention and has particular relevance to electrochromic devices.

Electrochromic devices using the polymer electrolytes according to the invention may have the structures and characteristics described in for instance GB-A-2081922, GB-A-2164170 and GB-A-2197527.

the lithium content of the solid polymer electrolyte may be chosen to achieve a suitable conductivity for the purpose of the electrochromic device or other device in which the electrolyte is to be used. For electrochromic displays, a relatively high conductivity is desired. For electrochromic windows and mirrors and other large electrochromic devices where speed of writing and erasing is less important than uniformity of coloration, a lower conductivity electrolyte may be desired.

The lithium concentration in the electrolyte may however be from 0.1 molal (based on the quantity of solvent such as propylene carbonate within the electrolyte) to 3 molal, e.g. from 0.1 molal to 0.4 molal for low conductivity applications and from 0.6 molal to 1.5 molal for higher conductivity uses.

To provide a satisfactory long term performance in an electrochromic device, it is necessary to exclude significant amounts of water from the electrolyte. We have found that water present in the electrolyte in an electrochromic device will react with the electrochromic layer, e.g. with lithium in a tungsten oxide layer, in such a device causing loss of performance. According, the electrolytes according to the invention contain no more than 500 ppm water. This may be achieved by rigorous drying of the separate components of the electrolyte prior to manufacture of the electrolyte by the method exemplified below. Preferably said water content is not more than 200 ppm, e.g. no more than 100 ppm.

Because it is difficult to prevent some take up of water during the processing of the electrolyte to place it in situ in an electrochromic device, it will generally be necessary to reduce the water content of each of the materials used in the electrolyte substantially below these levels, e.g. to no more than 10 ppm water, e.g. no more than 5 ppm.

The invention will be further described and illustrated with reference to the following specific examples.

EXAMPLE 1

A polymer electrolyte precursor according to the invention is formulated as follows:

Polymethylmethacrylate powder (molecular weight=80,000) is dried under vacuum for 16 hours at 50° C. Higher temperatures are avoided to prevent the fine powder coalescing into a solid mass which is more difficult to dissolve.

Propylene carbonate is dried to a water content below 10 ppmw over 4 Å molecular sieve for 12 hours and is distilled at 85° C. at 1 mm of Hg pressure (1.3 kPa). Lithium perchlorate fine powder is heated to 180° C. in air or dry nitrogen for 24 hours.

The dried propylene carbonate is added to the dried lithium perchlorate powder and stirred for 2 hours at 50° C., or at a greater temperature, e.g. 100° C. The polymethylmethacrylate powder is added and stirred at 50° C. until all the powder is dissolved. A higher temperature such as 130° C. can be used. The quantities employed are as follows:

|  | Weight (gms) |
| --- | --- |
| pmma | 25 |
| lithium perchlorate | 5.32 |
| propylene carbonate | 75 |

About 15 g of the propylene carbonate is lost in this preparation stage.

Titanium dioxide powder is dried at 180° C. for 24 hours and is sieved through a 60 mesh sieve before being added to the solution prepared previously. Further propylene carbonate is added with the titanium dioxide. Modaflow resin modifier is added also and is mixed at high speed with the rotor blade of a grinder to produce a precursor solution according to the invention for a pelymer electrolyte. The composition of the precursor is as follows:

|  | Weight (gms) |
| --- | --- |
| ppma | 25 |
| Lithium perchlorate | 5.32 |
| Propylene carbonate | 75 |
| Titanium dioxide | 10 |
| Modaflow | 2 |

EXAMPLE 2

A solid polymer electrolyte is produced from the precursor of Example 1 as follows. The precursor is printed through a 120 mesh stainless. steel screen patterned with a 23 micron emulsion thickness. The snap-off distance is set at $^{40}/_{1000}$" (1 mm). The printed film is dried at 75° C. in dry nitrogen to solidify it. A film thickness of 100 micrometres of solid printed electrolyte is produced by successive print and solvent removal cycles.

The composition of the solid polymer electrolyte after solvent removal is found to be as follows:

|  | Weight (percent) |
| --- | --- |
| ppma | 28.3 |
| Lithium perchlorate | 6.0 |
| Propylene carbonate | 40.8 |
| Titanium dioxide | 22.6 |
| Modaflow | 2.3 |

The percentage of polymer based upon the combined weight of polymer and solvent is therefore approximately 41 percent.

The conductivity of the solid polymer electrolyte is found to be $7.4 \times 10^{-5}$ $\Omega^{-1}$ $cm^{-1}$ and molar concentration of lithium perchlorate is 1.66.

EXAMPLE 3

Two further solid polymer electrolytes according to the invention prepared generally by a method as described above have the following compositions:

|  | Composition A weight percent | Composition B weight percent |
| --- | --- | --- |
| ppma | 35.5 | 36.2 |
| Lithium perchlorate | 7.6 | 3.8 |
| Propylene carbonate | 39.9 | 34.3 |
| Titanium dioxide | 14.2 | 21.7 |
| Modaflow | 2.8 | 4.0 |

The conductivity of composition A is $2.3 \times 10^{-5}$ $\Omega^{-1}$ $cm^{-1}$ and that of composition B is $8.7 \times 10^{-5}$ $\Omega^{-1}$ $cm^{-1}$ whilst the molal concentration of lithium perchlorate in composition A is 2.15 and in composition B is 1.25.

EXAMPLE 4

A precursor for a solid polymer electrolyte according to the invention made generally as described in Example 1 has the following composition:

|  | Parts by weight |
| --- | --- |
| Polymethylmethacrylate | 100 |
| Propylene carbonate | 384 |
| Lithium perchlorate | 17 |
| Modaflow | 20 |
| Titanium dioxide | 32 |
| Di-iso-octylphthalate | 16 |
| Silica | 4 |

The di-iso-octylphthalate is present as a plasticiser and the silica is hydrophobic silica.

EXAMPLE 5

A further precursor formulation is as follows:

|  | Parts by weight |
| --- | --- |
| Polymethylmethacrylate | 100 |
| Propylene carbonate | 384 |
| Lithium perchlorate | 17 |
| Modaflow | 20 |
| Titanium dioxide | 32 |
| Di-iso-octylphthalate | 40 |
| Silica | 4 |

EXAMPLE 6

An electrochromic device is constructed using the precursor formulations of Examples 4 and 5 as follows. The composition of Example 4 is screen printed through a polyester screen of 110 counts per inch with a mesh orientation of 25° and a 30 micron emulsion thickness at a snap-off distance of 0.1 mm. The composition is printed on to previously prepared pairs of substrates bearing electrodes and counter-electrodes of a known type for an electrochromic device. The printed substrates are heated in an oven at 100° C. for 20 minutes and the process of printing and solvent removal is repeated 4 times to build-up a satisfactory thickness of solid polymer electrolyte according to the invention.

A fifth print is made using the composition of Example 5 on each substrate and the resulting prints are dried for 2 minutes at 100° C. before being mated together in a tacky state under an even pressure of approximately 5 lbs per sq inch. The completed device is sealed around its edges in a water excluding manner to produce a finished electrochromic device.

EXAMPLE 7

A formulation for a transparent polymer electrolyte precursor which upon 50 percent solvent removal yields a solid electrolyte suitable for use in windows and mirrors is as follows:

|  | weight percent |
| --- | --- |
| ppma | 170 g |
| Propylene carbonate | 533 g (444 cc) |
| LiClO$_4$ | 21.2 g |
| Modaflow | 1.5 g |

We claim:

1. A process for making a solid polymer electrolyte comprising forming a solution by dissolving a conductive salt and a polymer in an alkylene carbonate, forming a thin layer of said solution and removing sufficient of said alkylene carbonate to solidify the electrolyte.

2. A process as claimed in claim 1, wherein said solution is screen printed to form said thin layer.

3. A process as claimed in claim 1, wherein said solution is cast on to a support to form said thin layer.

4. A process as claimed in any one of claims 1 to 3, wherein said solution contains a resin modifier conferring on said solution the properties of bubble release, surface levelling and clean snap-back so as to render the solution screen printable.

5. A process as claimed in claimed 1, wherein the solid electrolyte produced is a substantially water free solid polymer electrolyte for an electrochromic device comprising an alkylene carbonate, a polymer in a quantity sufficient to render the electrolyte solid and a conductive lithium salt, said electrolyte containing no more than 500 ppm water.

6. A process as claimed in claim 1, wherein the polymer is a polyalkylmethacrylate.

7. A process as claimed in claim 6, wherein the polymer is a polymethylmethacrylate.

8. A process as claimed in claim 1, wherein the alkylene carbonate is propylene carbonate.

9. A process as claimed in claim 1, wherein said salt is a lithium salt.

10. A process claimed in claim 1, wherein the content of said polymer in the solid electrolyte is from 35 to 45 percent by weight based upon the combined weight of said polymer and said alkylene carbonate.

11. A process as claimed in claim 10, wherein said percentage is about 40 percent.

12. A screen printable precursor for a solid polymer electrolyte, comprising a solvent, a polymer, a conductive salt and a resin modifier conferring on said precursor the properties of bubble release, surface levelling and clean snap-back so as to render said precursor screen printable.

13. A screen printable precursor for a solid polymer electrolyte as claimed in claim 12, wherein said resin modifier is an ethylacrylate, 2-ethylhexylacrylate copolymer.

14. A screen printable precursor for a solid polymer electrolyte as claimed in claim 12 or claim 13, wherein said solvent is propylene carbonate, said salt is lithium perchlorate and said polymer is polymethylmethacrylate.

15. An electrochromic device comprising an electrode and a counter-electrode separated by a solid polymer electrolyte which is the product of a process comprising forming a solution by dissolving a conductive salt and a polymer in an alkylene carbonate, forming a thin layer of said solution and removing sufficient of said alkylene carbonate to solidify the electrolyte.

16. A precursor for a solid polymer electrolyte, comprising an alkylene carbonate solvent, a polyalkylmethacrylate and a conductive salt, which precursor is solidifiable by removal of solvent and contains no more than 500 ppm of water.

17. A process for making a solid polymer electrolyte comprising: forming a solution by dissolving a conductive salt and a polymer in an alkylene carbonate; forming a thin layer of said solution; and removing sufficient of said alkylene carbonate to solidify the electrolyte, wherein the content of said polymer in the solid electrolyte is from 35 to 45 percent by weight based upon the combined weight of said polymer and said alkylene carbonate.

18. A process as claimed in claim 17, wherein the content of said polymer in the solid electrolyte is about 40 percent.

19. A screen printable precursor for a solid polymer electrolyte comprising: a solvent; a polymer; a conductive salt; and an ethylacrylate, 2-ethylhexylacrylate copolymer resin modifier, said resin modifier conferring on said precursor the properties of bubble release, surface levelling and clean snap-back so as to render said precursor screen printable.

20. A polymer electrolyte precursor as claimed in claim 19, wherein said solvent is propylene carbonate, said polymer is polymethylmethacrylate and said salt is lithium perchlorate.

* * * * *